United States Patent
Yi et al.

(10) Patent No.: US 9,119,096 B2
(45) Date of Patent: Aug. 25, 2015

(54) METHOD OF PERFORMING A MINIMIZATION OF DRIVE TEST (MDT) IN WIRELESS COMMUNICATION SYSTEM

(75) Inventors: Seungjune Yi, Gyeonggi-do (KR);
Sungduck Chun, Gyeonggi-do (KR);
Sunghoon Jung, Gyeonggi-do (KR);
Youngdae Lee, Gyeonggi-do (KR);
Sungjun Park, Gyeonggi-do (KR)

(73) Assignee: LG ELECTRONICS INC., Seoul (KR)

( * ) Notice: Subject to any disclaimer, the term of this patent is extended or adjusted under 35 U.S.C. 154(b) by 524 days.

(21) Appl. No.: 13/519,295

(22) PCT Filed: Jan. 28, 2011

(86) PCT No.: PCT/KR2011/000594
§ 371 (c)(1),
(2), (4) Date: Jun. 26, 2012

(87) PCT Pub. No.: WO2011/093665
PCT Pub. Date: Aug. 4, 2011

(65) Prior Publication Data
US 2012/0322386 A1      Dec. 20, 2012

Related U.S. Application Data

(60) Provisional application No. 61/299,317, filed on Jan. 28, 2010.

(51) Int. Cl.
*H04W 24/00* (2009.01)
*H04W 24/08* (2009.01)
*H04W 24/10* (2009.01)

(52) U.S. Cl.
CPC .............. *H04W 24/08* (2013.01); *H04W 24/10* (2013.01)

(58) Field of Classification Search
CPC ..... H04W 24/00; H04W 24/08; H04W 36/00; H04W 76/046
USPC ......................................... 455/423, 424, 425
See application file for complete search history.

(56) References Cited

U.S. PATENT DOCUMENTS

| | | |
|---|---|---|
| 2006/0128371 A1 | 6/2006 | Dillon et al. |
| 2009/0075648 A1 | 3/2009 | Reed et al. |
| 2009/0280853 A1 | 11/2009 | Brisebois et al. |
| 2010/0087188 A1* | 4/2010 | Griff et al. ..................... 455/424 |
| 2010/0323718 A1* | 12/2010 | Jen ............................. 455/456.1 |
| 2012/0220291 A1* | 8/2012 | Olsson et al. ................. 455/423 |

* cited by examiner

*Primary Examiner* — Opiribo Georgewill
(74) *Attorney, Agent, or Firm* — Dentons US LLP

(57) ABSTRACT

Disclosed is a wireless communication system and terminal for providing a wireless communication service, and more particularly, a method of UE effectively perform an operation of MDT (Minimization Driving Test) for specific parameter of each cell in an Evolved Universal Mobile Telecommunications System (E-UMTS) evolved from a UMTS, Long Term Evolution (LTE) System or LTE-Advanced (LTE-A) system.

12 Claims, 2 Drawing Sheets

METHOD OF PERFORMING A MINIMIZATION OF DRIVE TEST (MDT) IN WIRELESS COMMUNICATION SYSTEM

This application is a 35 U.S.C. §371 National Stage entry of International Application No. PCT/KR2011/000594, filed on Jan. 28, 2011, and claims the benefit of U.S. Provisional Application No. 61/299,317, filed on Jan. 28, 2010, each of which is incorporated by reference in its entirety herein.

TECHNICAL FIELD

The present invention relates to a wireless communication system and terminal for providing a wireless communication service, and more particularly, a method of performing a minimization of drive test (MDT), in an Evolved Universal Mobile Telecommunications System (E-UMTS) evolved from a UMTS, Long Term Evolution (LTE) System or LTE-Advanced (LTE-A) system.

BACKGROUND ART

FIG. 1 is a view illustrating a network architecture of an Evolved Universal Terrestrial Radio Access Network (E-UTRAN), which is a mobile communication system to which the related art and the present invention are applied. The E-UTRAN system has evolved from the existing UTRAN system, and a basic standardization work thereof is currently going on in 3GPP. The E-UMTS system may be also referred to as a Long Tenn Evolution (LTE) system.

The E-UTRAN includes a plurality of e-NBs (e-NodeB; hereinafter, referred to as "base station"), and the plurality of eNBs are connected to one another through an X2 interface. The eNB is connected to user equipment (hereinafter, referred to as "UE") via a wireless interface, and connected to an Evolved Packet Core (EPC) through an S1 interface.

The EPC may include a Mobility Management Entity (MME), a Serving-Gateway (S-GW), and a Packet Data Network-Gateway (PDN-GW). The MME has information on the connection of UE or the capability of UE, and such information is primarily used for the mobility management of the UE. The S-GW is a gateway having E-UTRAN as an end point, and the PDN-GW is a gateway having PDN as an end point.

The radio interface protocol layers between UE and a network can be divided into a first layer (L1), a second layer (L2) and a third layer (L3) based on three lower layers of an Open System Interconnection (OSI) reference model widely known in communications systems. A physical layer belonging to the first layer provides information transfer services using a physical channel, and a radio resource control (hereinafter, referred to as "RRC") layer located at the third layer plays a role of controlling radio resources between UE and a network. For the purpose of this, the RRC layer exchanges RRC messages between UE and a network.

FIGS. 2 and 3 are views illustrating an architecture of a radio interface protocol between UE and a base station based on the 3GPP radio access network standard. The radio interface protocol horizontally includes a physical layer, a data link layer, and a network layer, and vertically divided into a user plane (U-plane) for transmitting data information and a control plane (C-plane) for transferring a control signaling. The protocol layers of FIGS. 2 and 3 can be divided into a first layer (L1), a second layer (L2) and a third layer (L3) based on three lower layers of an Open System Inter-connection (OSI) reference model widely known in communications systems. Those radio protocol layers exist as a pair in the UE and the E-UTRAN to perform a data transmission for the radio section.

Hereinafter, each layer in a radio protocol control plane of FIG. 2 and a radio protocol user plane of FIG. 3 will be described.

The physical layer (PHY) which is a first layer provides information transfer services to the upper layers using a physical channel. The PHY layer is connected to the upper Medium Access Control (MAC) layer through a transport channel, and data between the MAC layer and the PHY layer is transferred through the transport channel. At this time, the transport channel is roughly divided into a dedicated transport channel and a common transport channel based on whether or not the channel is shared. Furthermore, data is transferred between different PHY layers, i.e., between PHY layers at the transmitter and receiver sides.

Various layers exist in the second layer. First, the Medium Access Control (MAC) layer serves to map various logical channels to various transport channels, and also performs a logical channel multiplexing for mapping several logical channels to one transport channel. The MAC layer is connected to an upper Radio Link Control (RLC) layer through a logical channel, and the logical channel is roughly divided into a control channel for transmitting control plane information and a traffic channel for transmitting user plane information according to the type of information to be transmitted.

The Radio Link Control (RLC) layer of the second layer manages segmentation and concatenation of data received from an upper layer to appropriately adjusts a data size such that a lower layer can send data to a radio section. Also, the RLC layer provides three operation modes such as a transparent mode (TM), an un-acknowledged mode (UM) and an acknowledged mode (AM) so as to guarantee various quality of services (QoS) required by each radio bearer (RB). In particular, AM RLC performs a re-transmission function through an automatic repeat and request (ARQ) function for reliable data transmission.

A Packet Data Convergence Protocol (PDCP) layer of the second layer performs a header compression function for reducing the size of an IP packet header which is relatively large in size and contains unnecessary control information to efficiently transmit IP packets, such as IPv4 or IPv6, over a radio section with a relatively small bandwidth. Due to this, information only required from the header portion of data is transmitted, thereby serving to increase the transmission efficiency of the radio section. In addition, in the LTE system, the PDCP layer performs a security function, which includes ciphering for preventing the third person's data wiretapping and integrity protection for preventing the third person's data manipulation.

A radio resource control (RRC) layer located at the uppermost portion of the third layer is only defined in the control plane. The RRC layer performs a role of controlling logical channels, transport channels and physical channels in relation to configuration, re-configuration, and release of Radio Bearers (RBs). Here, the RB denotes a logical path provided by the first and the second layers for transferring data between the UE and the UTRAN. In general, the establishment of the RB refers to a process of stipulating the characteristics of protocol layers and channels required for providing a specific service, and setting each of the detailed parameter and operation method thereof. The RB is divided into a signaling RB (SRB) and a data RB (DRB), wherein the SRB is used as a path for transmitting RRC messages in the C-plane while the DRB is used as a path for transmitting user data in the U-plane.

Hereinafter, an RRC mode and an RRC connection method of UE will be described in detail. The RRC mode refers to whether or not the RRC of the UE is logically connected to the RRC of an E-UTRAN. If connected, then it is called an RRC_CONNECTED mode, and otherwise it is called an RRC_IDLE mode. For the UE in an RRC_CONNECTED mode, the E-UTRAN can recognize the existence of the relevant UE in a cell unit because there exist an RRC connection thereof, and thus the E-UTRAN can effectively control the UE. On the contrary, for the UE in RRC_IDLE mode, the E-UTRAN cannot recognize the relevant UE, and therefore, it is managed by a core network in a tracking area unit, which is a unit larger than a cell. In other words, the existence of the UE in an RRC_IDLE mode is only recognized in a large area unit, and therefore, it should be changed to an RRC_CONNECTED mode in order to receive typical mobile communication services such as voice or data.

When the UE is initially turned on by a user, the UE first searches for a suitable cell and then is camped in an RRC_IDLE mode in the corresponding cell. The UE camped in an RRC_IDLE mode makes an RRC connection with the RRC of the E-UTRAN through an RRC connection procedure when it is required to make an RRC connection, thereby changing the state to an RRC_CONNECTED mode. There are several cases when the UE in an idle mode is required to make an RRC connection. For example, an uplink data transmission may be required due to a phone call attempt by the user, or the like, or the transmission of a response message may be required in response to a paging message received from the E-UTRAN.

Hereinafter, Minimization Driving Test (MDT) will be described. A principal purpose of MDT is to change a test, which was executed using an actual vehicle by the existing operators, into an efficient scheme, in order to ensure cell coverage optimization. That is, one scheme is to detect a coverage hole. Coverage depends on a construction of a new base station or building or a user's usage environment. Thus, an operator must periodically execute a driving test, which causes consumption of a lot of costs and resources. MDT has a concept of using users' terminals instead of actual coverage measurement by the operators.

DISCLOSURE OF INVENTION

Technical Problem

In general, during an operation of Minimization Driving Test (MDT), a service provider may have different parameter to be optimized for each cell. For example, the service provider may want to optimize a BCH (Broadcast Channel) parameter for a first cell and may want to optimize a PCH (Paging Channel) parameter for a second cell. However, an operation of logged MDT is performed only when a terminal is in a RRC Idle mode. In addition, since the connection between the terminal and the service provide is not established in the RRC Idle mode, a service provider cannot directly instruct the terminal to perform the logged MDT for specific parameter(s) in the cell. Namely, in a related art, the terminal must perform the operation of MDT for same parameter(s) for all of the cell, and this may cause a great drawback of a wasting of a unnecessary battery consumption and a memory storage.

Solution to Problem

Therefore, an object of the present invention is to provide a method for performing a logged MDT (Minimization Driving Test) in a radio communication system more effectively than in the related art.

To achieve the object of the present invention in accordance with one embodiment, there is provided a method of performing a measurement in wireless communication system, the method comprising: receiving a measurement configuration from a network, wherein the measurement configuration includes information indicating at least one type of a measurement logging; storing the received measurement configuration; receiving control information from the network, wherein the control information includes at least one type of measurement logging; and performing the measurement logging if the at least one type of measurement logging of the measurement configuration is matched with the at least one type of measurement loggings of the control information.

Preferably, the measurement configuration is a minimization driving test (MDT) configuration.

Preferably, the information included in the measurement configuration is related to a MDT class.

Preferably, the information included in the measurement configuration indicates a triggering condition of the measurement logging.

Preferably, the control information is received through system information (SI) or paging information.

Preferably, the measurement logging is performed based on the matched type of the measurement logging.

Preferably, the measurement logging is not performed if the at least one type of measurement logging of the measurement configuration is not matched with the at least one type of measurement loggings of the control information.

Preferably, the determination of whether the at least one type of measurement logging of the measurement configuration is matched with the at least one type of measurement loggings of the control information is performed when a terminal is camped on a new cell or when a terminal receives a new paging message.

Also, to achieve the object of the present invention in accordance with one embodiment, there is provided a method of performing a measurement in wireless communication system, the method comprising: transmitting a measurement configuration to a terminal, wherein the measurement configuration includes information indicating at least one type of a measurement logging; transmitting control information to the terminal, wherein the control information includes at least one type of measurement logging, wherein the measurement logging is performed by the terminal if the at least one type of measurement logging of the measurement configuration is matched with the at least one type of measurement loggings of the control information; and receiving the measurement logging from the terminal.

Further, to achieve the object of the present invention in accordance with one embodiment, there is provide an apparatus for performing a measurement in wireless communication system, the apparatus comprising: a transceiver to transmit or receive a data; a memory to store the data; and a processor cooperating with the transceiver and memory to perform the steps of: receiving a measurement configuration from a network, wherein the measurement configuration includes information indicating at least one type of a measurement logging; storing the received measurement configuration in the memory; receiving control information from the network, wherein the control information includes at least one type of measurement logging; and performing the measurement logging if the at least one type of measurement logging of the measurement configuration is matched with the at least one type of measurement loggings of the control information.

MODE FOR THE INVENTION

Figure 1:
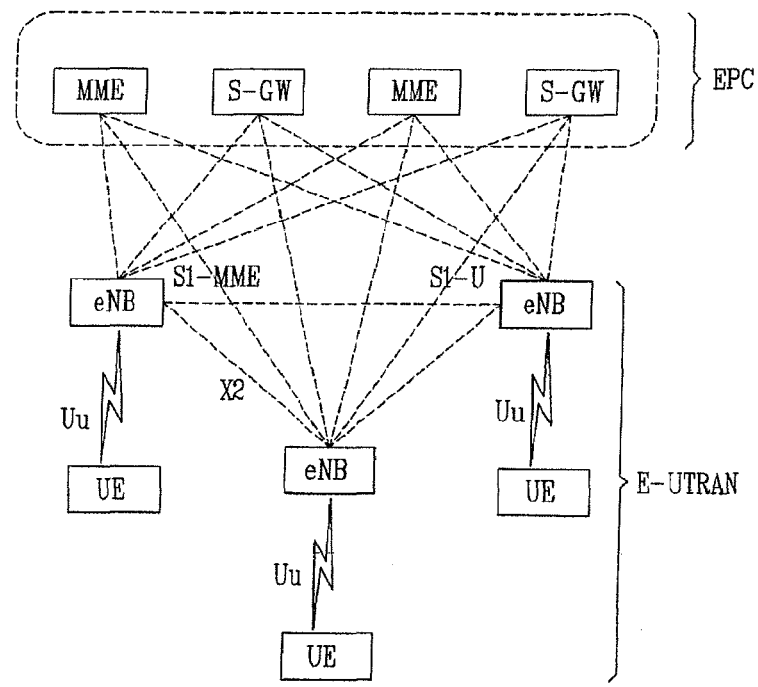
FIG. 1 is a network architecture of E-UTRAN as a mobile communication system to which the related art and the present invention are applied.
Figure 2:
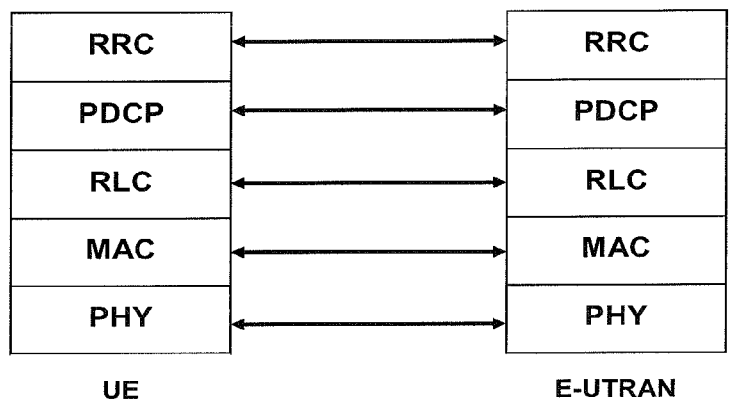
FIG. 2 is an exemplary view illustrating a control plane architecture in a radio interface protocol between UE and E-UTRAN.
Figure 3:
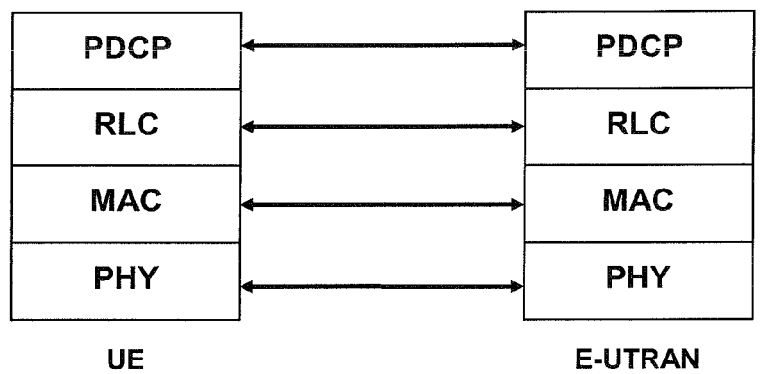
FIG. 3 is an exemplary view illustrating a user plane architecture in a radio interface protocol between UE and E-UTRAN.

One aspect of this disclosure relates to the recognition by the present inventors about the problems of the related art as described above, and further explained hereafter. Based upon this recognition, the features of this disclosure have been developed.

The present invention is applied to 3GPP communication technologies, especially, to communication apparatuses and methods in UMTS system, UTE system or UTE-A system. However, the present invention may not be limited to this communication type, but applicable to any wired/wireless communication complying with the scope of the present invention.

Hereinafter, description will be given of the configurations and operations of the preferred embodiment according to the present invention with reference to the accompanying drawings.

Hereinafter, Minimization Driving Test (MDT) will be described. A principal purpose of MDT is to change a test, which was executed using an actual vehicle by the existing operators, into an efficient scheme, in order to ensure coverage optimization. That is, one scheme is to detect a coverage hole. Coverage depends on a construction of a new base station or building or a user's usage environment. Thus, an operator must periodically execute a driving test, which causes consumption of a lot of costs and resources. MDT has a concept of using users' terminals instead of actual coverage measurement by the operators.

The Minimization Driving Test (MDT) may be divided into a logged MDT and an immediate MDT. The logged MDT is that, after performing the MDT measurement, the terminal stores (or logs) a measurement result and then transmits the logged MDT to a network (e.g., eNB) at particular time (or particular time period). The immediate MDT is that, after performing the MDT measurement, the terminal immediately transmits a measurement result to the network without storing the measurement result in a storage of the terminal. As described above, the difference between the logged MDT and the immediate MDT is that whether the measurement result is stored (or logged) or not. Here, if the terminal is in a RRC idle mode, the logged MDT may be used because the terminal cannot transmit the measurement result immediately in the RRC idle mode.

In general, a measuring value for the MDT is a quality of a cell that the terminal camped on. The measuring value may be measured as a reference signal received power (RSRP) and a reference signal received quality (RSRQ). If the logged MDT is set or configured, the terminal may measure the quality of cell in the RRC idle mode, and may store (or log) the measured quality of cell. Thereafter, the terminal may report the measured quality of cell (i.e., logged MDT, MDT measurement result) to a network. After receiving the MDT measurement result from the terminal, the network may optimize a coverage of cell by adjusting or controlling a signal power of the cell using the received MDT measurement result.

Here, a MDT triggering class (or MDT triggering condition) may be used for indicating the terminal (in a RRC Idle mode) to perform a logged MDT under a certain circumstance. (i.e., when to perform the MDT, what parameters should be measured, etc) Here, the MDT triggering class may be selectively set by a service provider. (i.e., which parameters should be measured for cell or network optimization) Namely, the terminal may perform the MDT (i.e, logging the MDT measurement value) only when the MDT triggering class is occurred or when the MDT triggering class is met with a certain condition. A following can be considered as examples of the MDT triggering class according to the present invention, 1) periodical triggering: the terminal logs the MDT measurement value periodically. In general, this triggering class may be used when the service provider wants to obtain an overall coverage map of the cell, 2) a quality of serving cell becomes worse than a threshold: the terminal logs the MDT measurement when the quality of the serving cell becomes worse than the threshold value. This triggering class may be used when the service provider wants to obtain a coverage map of a specific area within a cell. (i.e., area that overlaps with a neighboring cell), 3) a transmit power headroom becomes worse than a threshold: the terminal logs the MDT measurement when the transmit power headroom of uplink transmission becomes worse than the threshold value. This triggering class may be used when the service provider wants to know a specific area that has insufficient uplink transmit power headroom (i.e., UL link budget). By using this MDT measurement, the service provider may properly adjust a power-offset value of the terminal, 4) Random access failure: The terminal logs the MDT measurement when a RACH (random access channel) access procedure is failed. Usually, the failure of the RACH access is occurred if the power control cannot be performed properly or if there is a congestion situation in the cell. By using the MDT measurement, the failure of the RACH access can be prevented by controlling parameter used in a open loop power control and by controlling a RACH back-off value to reduce the congestion in the cell, 5) Failure of receiving paging channel: The terminal logs the MDT measurement when a reception of the paging channel is failed. By using the MDT measurement, a power of the paging channel can be properly adjusted, and 6) Failure of receiving broadcast channel: The terminal logs MDT measurement when a reception of the broadcast channel is failed. By using the MDT measurement, a power of the broadcast channel can be properly adjusted.

According to the present invention, an operation of the logged MDT is perform when a certain MDT performance condition provided by a service provider is satisfied.

First, a terminal may receive and store a MDT performance condition (i.e, MDT class) of the logged MDT, which will be performed in a RRC idle mode. Here, the MDT performance condition (i.e., MDT class) may be received from a network through a dedicated RRC message when the terminal is in a RRC connected mode. Alternatively, the MDT performance condition (i.e., MDT class) may be set by a manufacture when the terminal is manufactured. Here, the MDT performance condition may indicate a certain condition that the terminal should log a MDT measurement result. For example, the MDT performance condition may be defined as following, 1) periodical performance: the terminal may log the MDT measurement result periodically. In general, this periodical performance may be used when an overall coverage map of the cell is required to be obtained, 2) a quality of serving cell becomes worse than a threshold: the terminal may log the MDT measurement result when the quality of the serving cell becomes worse than the threshold value. This MDT performance condition may be used when a coverage map of a specific area (i.e., overlapping area with a neighboring cell) within a cell is required to be obtained, 3) a transmit power headroom becomes worse than a threshold: the terminal may log the MDT measurement result when the transmit power headroom of uplink transmission becomes worse than the threshold value. This MDT performance condition may be used when information related to a specific area insufficient for the uplink transmit power headroom is required to be obtained, 4) Random access failure: the terminal may log the MDT measurement result when a RACH (random access channel) access procedure is failed. Usually, the failure of the RACH access is occurred if the power control cannot be performed properly or if there is a congestion situation in the cell. By using the MDT measurement result, the failure of the RACH access can be prevented by controlling parameter used in a open loop power control and by controlling a RACH back-off value to reduce the congestion in the cell, 5) Failure of receiving paging channel: the terminal may log the MDT measurement result when a reception of the paging channel is failed. By using the MDT measurement result, a power of the paging channel can be properly adjusted, and 6) Failure of receiving broadcast channel: the terminal may log MDT measurement result when a reception of the broadcast channel is failed. By using the MDT measurement result, a power of the broadcast channel can be properly adjusted. Here, the MDT performance condition (i.e., MDT class) may be represented as an index, for example, the MDT class may be set as a MDT class 1=periodical, a MDT class 5=PACH failure, a MDT class 6=BCH failure, etc.

Thereafter, the network may broadcast a certain MDT performance condition to a terminal through system information. That is, the system information may include the MDT performance condition (i.e., MDT class) in order to instruct the terminal to perform the MDT measurement only when the MDT performance condition is met. Here, the system information may include a plurality of the MDT performance conditions. Further, the network may set different MDT performance condition for each cells.

When the terminal changes its state to a RRC idle mode, the terminal may camp on a suitable cell based on a radio quality or a frequency priority order, and may receive a MDT class through system information of the cell that the terminal camped on. Here, the above steps may be repeatedly executed whenever the terminal performs a cell selection or a cell reselection in a RRC idle mode. Further, the above steps may be executed whenever the terminal receives a system information update information through a paging message. Here, the paging message may be occurred at a MDT specific paging occasion or a MDT class specific paging occasion. Further, the paging message may further include MDT class update information, and the paging message itself may include the updated or changed MDT class information.

Thereafter, the terminal may compare a MDT class obtained from the system information with a MDT class stored in the terminal storage. After comparison, if the MDT class stored in the terminal storage is matched with the MDT class of the system information, the terminal may apply a logged MDT performance condition to a corresponding cell. That is, the terminal may log a MDT measurement result when the MDT performance condition is satisfied. Here, the MDT measurement result may be a currently measured MDT measurement result or may be a previously measured MDT measurement result. After comparison, if the MDT class stored in the terminal storage is not matched with the MDT class of the system information, the terminal may suspend to perform a logged MDT with respect to the corresponding cell.

Thereafter, when the terminal changes its state to the RRC connected mode, the terminal may transmit a measurement report, which includes the logged MDT measurement result in the RRC idle mode, to the network. Here, the measurement report may be transmitted to the network through a dedicated RRC message. Further, the measurement report may include a plurality of different logged MDT measurement result for various different MDT classes, and each of the logged measurement result may includes a corresponded MDT class in order to identify its MDT class from other different MDT classes.

Figure 4:
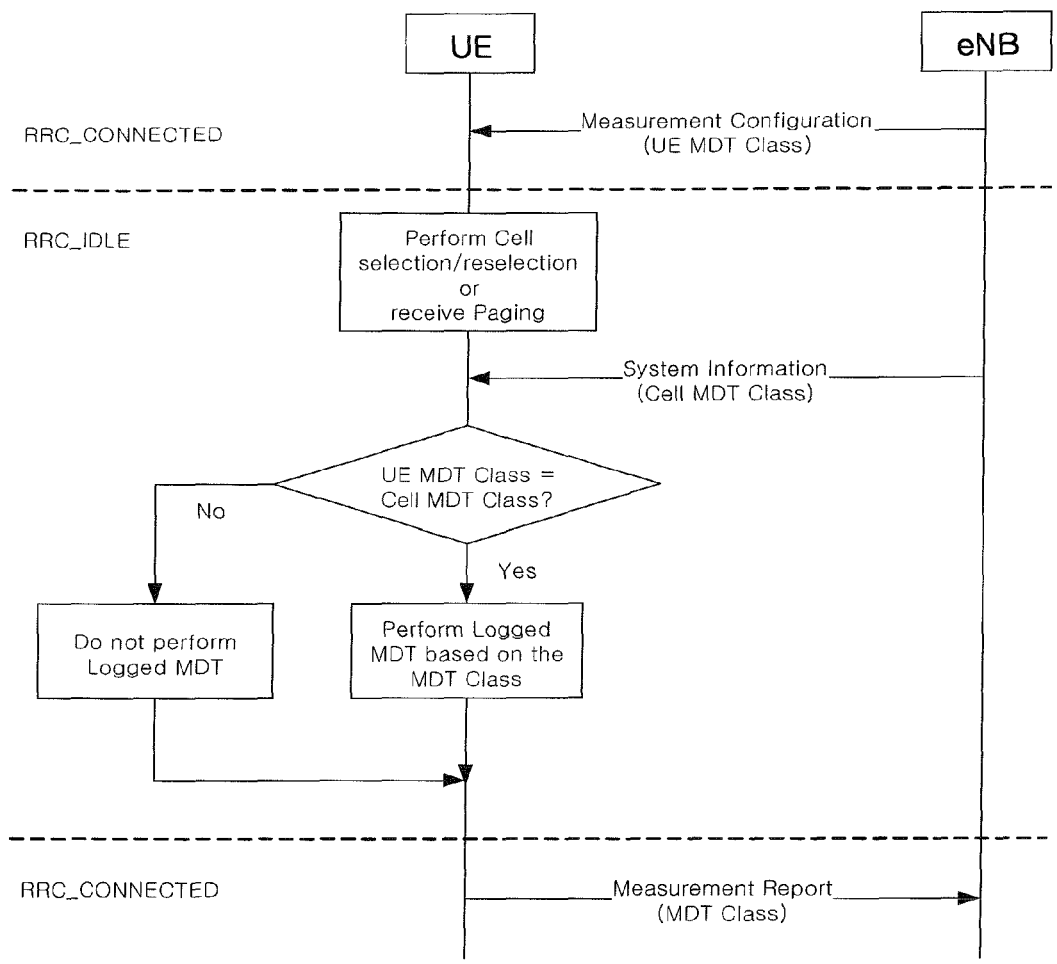
FIG. 4 is an exemplary view illustrating a procedure for performing a logged MDT (Minimization Driving Test) in accordance with the present invention.

FIG. 4 is an exemplary view illustrating a procedure for performing a logged MDT (Minimization Driving Test) in accordance with the present invention.

As illustrated in FIG. 4, a terminal (UE) may receives a measurement configuration (or a measurement configuration message) from a network (e.g., eNB) in a RRC connected mode. Here, the measurement configuration message may include information related to a MDT class (i.e, UE MDT class). Here, the received measurement configuration may be stored in a storage unit (e.g., memory, buffer) of the terminal.

Thereafter, when the terminal changes its state to a RRC Idle mode, the terminal may camp one a suitable cell (by means of performing a cell selection/reselection or receiving paging) and may obtain MDT class information (i.e., Cell MDT class) for the camped on cell by receiving system information. Thereafter, the terminal may compare the cell MDT class of the system information with the UE MDT class stored in the storage unit. If the one of the cell MDT class of the system information matches with the UE MDT class stored in the terminal, the terminal may perform an operation of logged MDT based on the matched MDT class, and may log a measurement result after performing the logged MDT. If none of the cell MDT class of the system information matches with the UE MDT class stored in the terminal, the terminal may not perform the operation of logged MDT. Thereafter, when the terminal changes its state to the RRC connected mode, the terminal may transmit a measurement report, which includes the logged measurement result in the RRC idle mode, to the network. Here, the measurement report may be transmitted to the network through a dedicated RRC message. Further, the measurement report may include a plurality of different logged measurement result for various MDT classes, and each of the logged measurement result may includes a corresponded MDT class in order to identify its MDT class from other MDT classes.

As described above, a MDT (Minimization of Drive Test) is a new feature introduced in a LTE/UMTS system to facilitate automating the collection of terminal (UE) measurements to minimize the need of manual drive-tests. According to the present invention, it is possible for the terminal (UE) to perform MDT measurement in idle mode, which is referred to a logged MDT. According to the present invention, during the operation of logged MDT, the terminal obtains a MDT class, and stores the MDT class in the memory. Here, the MDT class is obtained by a dedicated RRC message from a network when the terminal is connected to the network, or the MDT class is inherently set when the UE is manufactured. The MDT class indicates which MDT measurement logging terminal should perform. Here, the logging MDT may means that the UE either performs new measurements and logs the measurement results, or logs already available measurement results. Here, the MDT class may indicate a UE priority, UE access class, etc. The network (eNB) may select particular UEs in idle mode for MDT measurements logging by broadcast message. Here, the MDT class may be broadcasted in System Information (SI). And, instead of broadcasting one MDT class, a plurality of MDT classes may be broadcast. The MDT class in the system information may indicates which MDT measurement logging should be performed. The MDT class broadcast in system information may be different between cells. That is, the network may configure the MDT classes specific to a cell. thereafter, when the idle mode UE reads system information, the idle mode UE may checks whether the MDT class in system information matches the MDT class stored in the UE. If two MDT classes match, the UE may perform the MDT measurement logging indicated by the MDT class, otherwise the UE does not perform the MDT measurement. The change of MDT class in system information may be indicated to the UE by a Paging message. Namely, a MDT specific paging occasion or a MDT class specific Paging Occasion may be defined. Further, a paging message may contain the change indication of MDT class in the system information or a paging message may contain information of the changed MDT class.

The present invention may provide a method of performing a measurement in wireless communication system, the method comprising: receiving a measurement configuration from a network, wherein the measurement configuration includes information indicating at least one type of a measurement logging; storing the received measurement configuration; receiving control information from the network, wherein the control information includes at least one type of measurement logging; and performing the measurement logging if the at least one type of measurement logging of the measurement configuration is matched with the at least one type of measurement loggings of the control information, wherein the measurement configuration is a minimization driving test (MDT) configuration, the information included in the measurement configuration is related to a MDT class, the information included in the measurement configuration indicates a triggering condition of the measurement logging, the control information is received through system information (SI) or paging information, the measurement logging is performed based on the matched type of the measurement logging, the measurement logging is not performed if the at least one type of measurement logging of the measurement configuration is not matched with the at least one type of measurement loggings of the control information, the determination of whether the at least one type of measurement logging of the measurement configuration is matched with the at least one type of measurement loggings of the control information is performed when a terminal is camped on a new cell, the determination of whether the at least one type of measurement logging of the measurement configuration is matched with the at least one type of measurement loggings of the control information is performed when a terminal receives a new paging message.

It can be also said that a method of performing a measurement in wireless communication system, the method comprising: transmitting a measurement configuration to a terminal, wherein the measurement configuration includes information indicating at least one type of a measurement logging; transmitting control information to the terminal, wherein the control information includes at least one type of measurement logging, wherein the measurement logging is performed by the terminal if the at least one type of measurement logging of the measurement configuration is matched with the at least one type of measurement loggings of the control information; and receiving the measurement logging from the terminal, the measurement configuration is a minimization driving test (MDT) configuration, the information included in the measurement configuration is related to a MDT class, the control information is transmitted through system information (SI) or paging information, the measurement logging is not performed by the terminal if the at least one type of measurement logging of the measurement configuration is not matched with the at least one type of measurement loggings of the control information.

The present invention may further provide an apparatus for performing a measurement in wireless communication system, the apparatus comprising: a transceiver to transmit or receive a data; a memory to store the data; and a processor cooperating with the transceiver and memory to perform the steps of: receiving a measurement configuration from a network, wherein the measurement configuration includes information indicating at least one type of a measurement logging; storing the received measurement configuration in the memory; receiving control information from the network, wherein the control information includes at least one type of measurement logging; and performing the measurement logging if the at least one type of measurement logging of the measurement configuration is matched with the at least one type of measurement loggings of the control information.

The present invention provides a method can efficiently perform an operation of MDT (Minimization Driving Test) in a wireless communication system. According to the present invention, a terminal can perform a logged MDT for only specific parameter of each cell. Unlike the related art, since the terminal does not perform the operations of MDT for same parameter(s) for all of the cell, unnecessary battery consumption and a memory storage can be prevented.

Hereinafter, a terminal in accordance with the present invention will be described.

Although the present disclosure is described in the context of mobile communications, the present disclosure may also be used in any wireless communication systems using mobile devices, such as PDAs and laptop computers equipped with wireless communication capabilities (i.e. interface). Moreover, the use of certain terms to describe the present disclosure is not intended to limit the scope of the present disclosure to a certain type of wireless communication system. The present disclosure is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present disclosure, and that the article of manufacture may comprise any information bearing medium known in the art.

As the present disclosure may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of performing a measurement in wireless communication system, the method performed by a user equipment (UE) and comprising:
receiving, from a network, a UE MDT(minimization driving test) class information indicating performance conditions for MDT when the UE is in a RRC (Radio Resource Control) connected mode;
receiving, from the network, system information including one or more Cell MDT class information after a connection mode of the UE changes to a RRC idle mode from the RRC connected mode;
performing MDT measurement according to the UE MDT class information when the UE MDT class information is matched with one or more Cell MDT class information while the UE is in the RRC idle mode; and
performing a paging procedure with the network when the UE receives system information including changed Cell MDT class information different from the one or more Cell MDT class information.

2. The method of claim 1, wherein the UE MDT class information is received using RRC (Radio Resource Control) signaling.

3. The method of claim 1, wherein the UE MDT class information indicates a triggering condition of a measurement logging.

4. The method of claim 1, wherein the system information is broadcasted.

5. The method of claim 1, wherein the one or more Cell MDT class information is different between cells.

6. The method of claim 1, wherein the MDT measurement is not performed if the UE MDT class information is not matched with one or more Cell MDT class information.

7. The method of claim 1, wherein the performing MDT measurement step is performed when a terminal is camped on a new cell.

8. The method of claim 1, wherein the performing MDT measurement step is performed when a terminal receives a new paging message.

9. A method of performing a measurement in wireless communication system, the method comprising:
transmitting, by a first base station (BS) to a user equipment(UE), a UE MDT(minimization driving test) class information indicating performance conditions for MDT when the UE is in a RRC (Radio Resource Control) connected mode;
transmitting, by a second BS to the UE, a system information including one or more Cell MDT class information after a connection mode of the UE is changed to a RRC idle mode from the RRC connected mode;
receiving MDT measurement information according to the UE MDT class information when the UE MDT class information is matched with one or more Cell MDT class information while the UE is in the RRC idle mode; and
transmitting a system information including changed Cell MDT class information different from the one or more Cell MDT class information when a paging procedure is necessary.

10. The method of claim 9, wherein the UE MDT class information is received using RRC (Radio Resource Control) signaling.

11. The method of claim 9, wherein the system information is broadcasted.

12. An apparatus for performing a measurement in wireless communication system, the apparatus comprising:
a transceiver to transmit or receive a data;
a memory to store the data; and
a processor which is configured to:
receive, from a network, a UE MDT(minimization driving test) class information indicating performance conditions for MDT when the UE is in a RRC (Radio Resource Control) connected mode;
receive, from the network, system information including one or more Cell MDT class information after the UE is changed to a RRC idle mode from the RRC connected mode;
perform MDT measurement according to the UE MDT class information when the UE MDT class information is matched with one or more Cell MDT class information while the UE is in the RRC idle mode; and
perform paging procedure with the network when the UE receives system information including changed Cell MDT class information different from the one or more Cell MDT class information.

* * * * *